United States Patent [19]
Gershony et al.

[11] Patent Number: 5,508,828
[45] Date of Patent: Apr. 16, 1996

[54] APPARATUS AND METHOD FOR GENERATING A SCREENED REPRODUCTION OF AN IMAGE EMPLOYING A NON-PERIODIC SCREEN FUNCTION

[75] Inventors: Moshe Gershony, Kfar Sava; Gil Fisher, Petach Tikva, both of Israel

[73] Assignee: Scitex Corporation Ltd., Herzliya, Israel

[21] Appl. No.: 159,741

[22] Filed: Nov. 30, 1993

[30] Foreign Application Priority Data

Jul. 28, 1993 [IL] Israel ......................................... 106514

[51] Int. Cl.$^6$ ............................. H04N 1/40; H04N 1/38; H04N 1/46
[52] U.S. Cl. ........................... 358/536; 358/459; 358/534; 358/456
[58] Field of Search .................... 358/401, 501, 358/515, 517, 521, 522, 534, 535, 536, 456, 457, 458, 459, 461, 466; 364/518, 519, 520, 521, 235 MS, 237.7 MS, 930 MS, 929.3 MS; 340/700, 701, 702, 703, 704; 346/157

[56] References Cited

U.S. PATENT DOCUMENTS

| | | | |
|---|---|---|---|
| 4,040,094 | 8/1977 | Everett et al. | 358/283 |
| 4,149,183 | 4/1979 | Pellar et al. | 358/536 |
| 4,350,996 | 9/1982 | Rosenfeld | 358/536 |
| 4,456,924 | 6/1984 | Rosenfeld | 358/536 |
| 4,482,923 | 11/1984 | Fischer et al. | 358/456 |
| 4,499,489 | 2/1985 | Gall et al. | 358/536 |
| 4,673,971 | 6/1987 | Ikuta et al. | 358/536 |
| 4,700,235 | 10/1987 | Gall | 358/283 |
| 4,768,101 | 8/1988 | Webb | 358/298 |
| 5,079,721 | 1/1992 | Gershony | 395/132 |
| 5,111,310 | 5/1992 | Parker et al. | 358/456 |
| 5,121,197 | 6/1992 | Yamada et al. | 358/535 |
| 5,124,803 | 6/1992 | Troxel | 358/459 |
| 5,150,225 | 9/1992 | Kreitman | 358/456 |
| 5,187,594 | 2/1993 | Deutsch et al. | 358/459 |
| 5,202,772 | 4/1993 | Muir | 358/459 |
| 5,227,895 | 7/1993 | Carlebach | 358/456 |
| 5,258,832 | 11/1993 | Rylander | 358/527 |
| 5,264,926 | 11/1993 | Rylander | 358/500 |
| 5,299,020 | 3/1994 | Carlebach | 358/459 |
| 5,315,406 | 5/1994 | Levien | 358/459 |

FOREIGN PATENT DOCUMENTS

| | | | |
|---|---|---|---|
| 0141869 | 11/1983 | European Pat. Off. | H04N 1/40 |
| 0540221 | 10/1992 | European Pat. Off. | H04N 1/40 |

OTHER PUBLICATIONS

Allebach, J. P., "Random Nucleated Halftone Screen", Photograph Science and Engineering, vol. 22, No. 2, Mar. 1978, Washington, pp. 89–91.

*Primary Examiner*—Edward L. Coles, Sr.
*Assistant Examiner*—Kimberly A. Williams
*Attorney, Agent, or Firm*—Ladas & Parry

[57] ABSTRACT

A method for generating a screened reproduction of an image including the steps of providing a representation of an original having input density values representing the grey levels of various locations of the original for a given color separation, defining a desired irregular screen function for the image and writing screen segments in a line by line fashion, wherein each screen segment is a line whose length and location is determined by employing the input density values of the original and the desired irregular screen function.

24 Claims, 8 Drawing Sheets

|   | 48 | 79 | 13 | 25 | 21 | 1  | 98 | 14 | 3  | 11 | 84 | 30 |
|---|----|----|----|----|----|----|----|----|----|----|----|----|
|   | 26 | 30 | 3  | 77 | 15 | 22 | 34 | 4  | 44 | 7  | 12 | 66 |
| K | 88 | 5  | 9  | 31 | 6  | 68 | 10 | 13 | 17 | 55 | 22 | 69 |
|   | 23 | 29 | 71 | 61 | 4  | 11 | 19 | 79 | 2  | 95 | 5  | 3  |
|   | 54 | 43 | 8  | 88 | 3  | 30 | 70 | 5  | 2  | 44 | 9  | 3  |

N

|   |   |   |   |   |   |   |   |   |   |   |   |
|---|---|---|---|---|---|---|---|---|---|---|---|
|   | 1 | 22 | 7 | 11 | 23 | 30 | 45 | 67 | 88 | 77 | 15 | 10 |
|   | 5 | 35 | 40 | 20 | 18 | 15 | 52 | 54 | 80 | 70 | 17 | 12 |
| K | 4 | 42 | 48 | 22 | 20 | 17 | 60 | 65 | 79 | 64 | 19 | 11 |
|   | 7 | 44 | 55 | 26 | 27 | 19 | 30 | 32 | 27 | 22 | 20 | 14 |
|   | 9 | 49 | 67 | 30 | 29 | 21 | 27 | 25 | 10 | 9 | 3 | 1 |

N

5,508,828

APPARATUS AND METHOD FOR GENERATING A SCREENED REPRODUCTION OF AN IMAGE EMPLOYING A NON-PERIODIC SCREEN FUNCTION

FIELD OF THE INVENTION

The present invention relates to screened image reproduction and more particularly to a method and apparatus for electronically generating a screened reproduction of an image.

BACKGROUND OF THE INVENTION

Electronic screening for image reproduction is well known in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded by threshold values, defining a cell memory matrix. Input digitized scanned density values of an image, such as a color separation, are compared with the threshold values, cell by cell. The results provide an on/off control input for a laser plotter.

U.S. Pat. No. 4,149,183 describes an electronic halftone generator wherein a halftone signal is generated by pulse width modulating or comparing the scanned or video signal with a periodic analog signal having two frequencies and phases to create a dot pattern output which is a function of the frequency and phase of the two combined modulating signals. The halftone reproduction generated has variable dot configurations that are controllable to enable both rotation of the dot pattern and geometric modifications of the dot pattern.

U.S. Pat. No. 5,079,721 of the present assignee/applicant describes apparatus and a technique for generating a screened reproduction of an image comprising the steps of providing a representation of an original having input density values representing the grey levels of various locations of the original for a given color separation, defining a desired screen dot arrangement for the image, writing screen dots in a line by line fashion, wherein each screen dot is made up of a plurality of lines whose length and location determines the dot configuration and whose length and location is determined by an analog operation employing the input density values of the original and the desired screen dot arrangement.

U.S. Pat. No. 4,040,094 describes a method and apparatus for electronic screening of a graphic image to be reproduced by printing. The density of the graphic image is determined repetitively during the digital generation of each dot which will form a part of the half-tone image when produced, and the dot is modified according to changes in the density. Thus the structure of any halftone dot may be modified during its construction.

SUMMARY OF THE INVENTION

The present invention seeks to provide an improved technique for generating a screened reproduction of an image.

There is thus provided in accordance with a preferred embodiment of the present invention a method for generating a screened reproduction of an image including the steps of:

providing a representation of an original having input density values representing the grey levels of various locations of the original for a given color separation;

defining a desired non-periodic screen function for the image; and writing screen segments in a line by line fashion, wherein each screen segment is a line whose length and location is determined by employing the input density values of the original and the desired non-periodic screen function.

Additionally in accordance with a preferred embodiment of the present invention, the step of writing screen segments includes the following steps:

storing the input density values of the original at a first spatial resolution; and storing the threshold values of the desired non-periodic screen function at a second spatial resolution different from the first resolution.

In accordance with a preferred embodiment of the present invention, the step of writing screen segments includes the following steps:

prior to plotting, defining the non-periodic screen function; and thereafter comparing the input density values along the line with the non-periodic screen function to determine the length and location of each segment produced by the plotter.

Preferably, the step of writing screen segments includes determining the length and location of each screen segment in all analog operation by employing the input density values of the original and the desired non-periodic screen function.

In accordance with a preferred embodiment of the present invention, the analog operation includes an analog comparison of the input density values with threshold values defined by the desired non-periodic screen function.

There is also provided in accordance with a preferred embodiment of the present invention apparatus for generating a screened reproduction of an image including:

apparatus for providing a representation of an original having input density values representing the grey levels of various locations of the original for a given color separation;

apparatus for defining a desired non-periodic screen function for the image; and apparatus for writing screen segments in a line by line fashion, wherein each screen segment is a line whose length and location is determined employing the input density values of the original and the desired non-periodic screen function.

Preferably each segment has generally unlimited resolution along its length.

In accordance with a preferred embodiment of the present invention, the apparatus for writing screen segments includes:

apparatus for storing the input density values of the original at a first spatial resolution; and apparatus for storing the threshold values of the desired non-periodic screen function at a second spatial resolution different from the first resolution.

Preferably the second spatial resolution corresponds to the line to line spatial resolution of a plotter used for writing the screen segments.

In accordance with a preferred embodiment of the invention, the apparatus for writing screen segments includes:

apparatus operative, prior to plotting, for defining the non-periodic screen function; and apparatus for comparing the input density values along the line with the non-periodic screen function to determine the length and location of each segment produced by the plotter.

Preferably, the non-periodic screen function is a function which is repeated along each line and from line to line.

In accordance with a preferred embodiment of the present invention a different shift is added to the non-periodic screen function at the beginning of each line.

Preferably, the non-periodic screen function is a one-dimensional function.

Preferably, the apparatus for writing screen segments is operative to determine the length and location of each screen segment in an analog operation by employing the input density values of the original and the desired non-periodic screen function.

In accordance with a preferred embodiment of the present invention, the analog operation includes an analog comparison of the input density values with threshold values defined by the desired non-periodic screen function.

Additionally in accordance with a preferred embodiment of the present invention there is provided a method for halftone reproduction of an image including the steps of:

providing a representation of an original having input density values at various locations of the original;

defining a desired non-periodic screen function for the image, the non-periodic screen function having a minimum spatial frequency which is higher than that normally visible by the human eye; and providing output data to a plotter based on manipulation of the input density values on the basis of the non-periodic screen function.

Further in accordance with a preferred embodiment of the present invention there is provided a method for halftone reproduction of an image including the steps of:

providing a representation of an original having input density values at various locations of the original;

defining a desired non-periodic screen function for the image, the non-periodic screen function having a spatial repeatability sufficiently small so that it is not normally visible by the human eye; and providing output data to a plotter based on manipulation of the input density values on the basis of the non-periodic screen function.

Still further in accordance with a preferred embodiment of the present invention there is provided apparatus for halftone reproduction of an image including:

apparatus for providing a representation of an original having input density values at various locations of the original;

apparatus for defining a desired non-periodic screen function for the image, the nonlperiodic screen function having a minimum spatial frequency which is higher than that normally visible by the human eye; and apparatus for providing output data to a plotter based on manipulation of the input density values on the basis of the non-periodic screen function.

Additionally in accordance with a preferred embodiment of the present invention there is provided apparatus for halftone reproduction of an image including:

apparatus for providing a representation of an original having input density values at various locations of the original;

apparatus for defining a desired non-periodic screen function for the image, the non-periodic screen function having a spatial repeatability sufficiently small so that it is not normally visible by the human eye; and apparatus for providing output data to a plotter based on manipulation of the input density values on the basis of the non-periodic screen function.

Preferably, the non-periodic screen function has a plurality of maxima and minima and wherein the screen function displays non-periodicity in at least one of the spatial separation of the minima and maxima and in the values of the minima and maxima.

In accordance with a preferred embodiment of the present invention, the non-periodic screen function has a minimum spatial frequency of 6 minimum-maximum pairs per millimeter.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
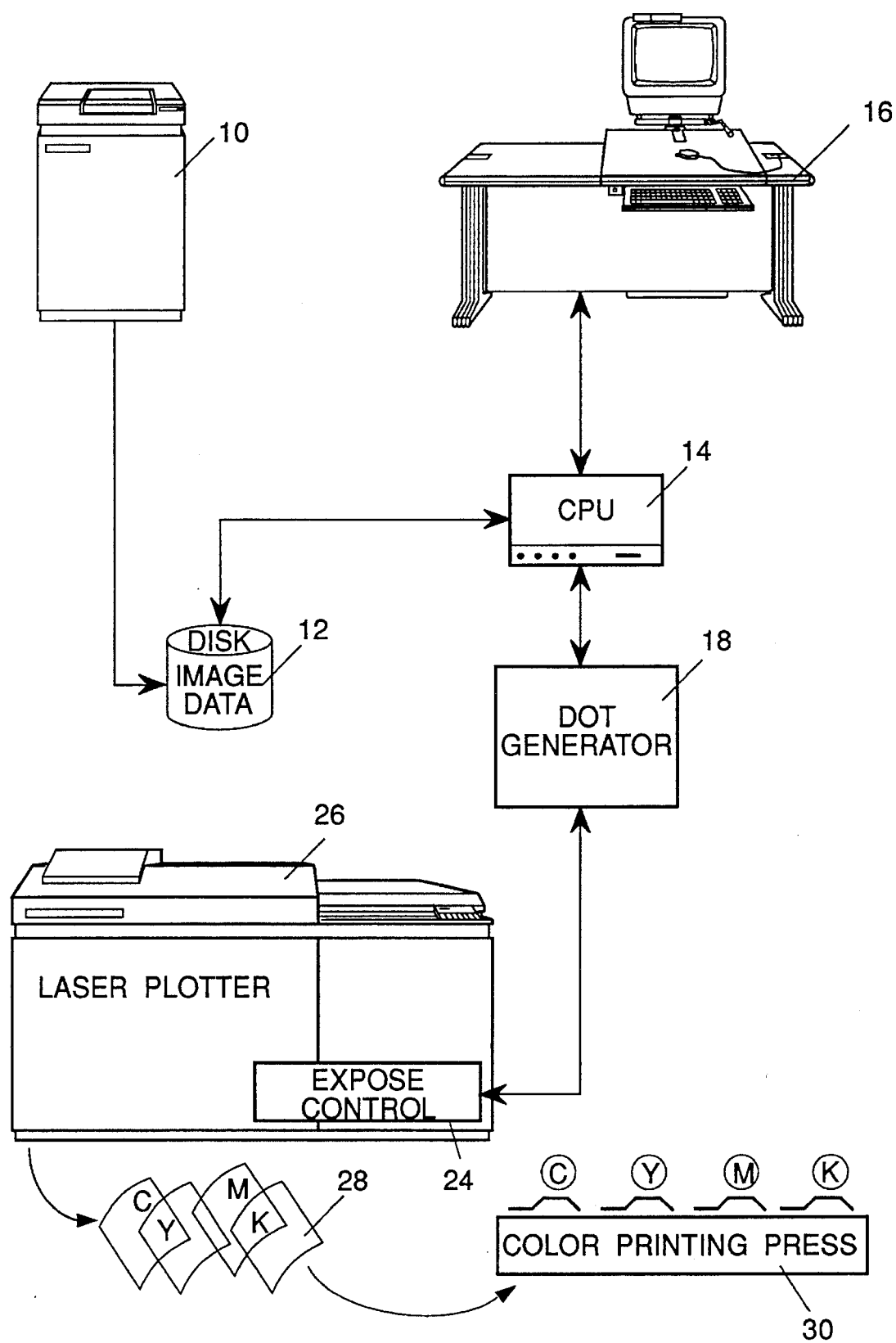
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on a image data disc 12 or any other suitable storage medium, which is accessible by a CPU 14, such as an Intel 80386. Interfacing with the CPU 14 is an interactive workstation 16, such as a Scitex Prisma, manufactured and sold by Scitex Corporation Ltd. of Herzlia, Israel.

CPU 14 interfaces with screen dot generation circuitry 18, which in turn provides a control output to laser beam control circuitry 24 in a laser plotter 26, such as a Raystar, manufactured and sold by Scitex Corporation Ltd. of Herzlia, Israel.

Laser plotter 26 produces halftone film color separations 28 which are employed in a conventional process color printing press 30, to produce process color prints.

Figure 2:
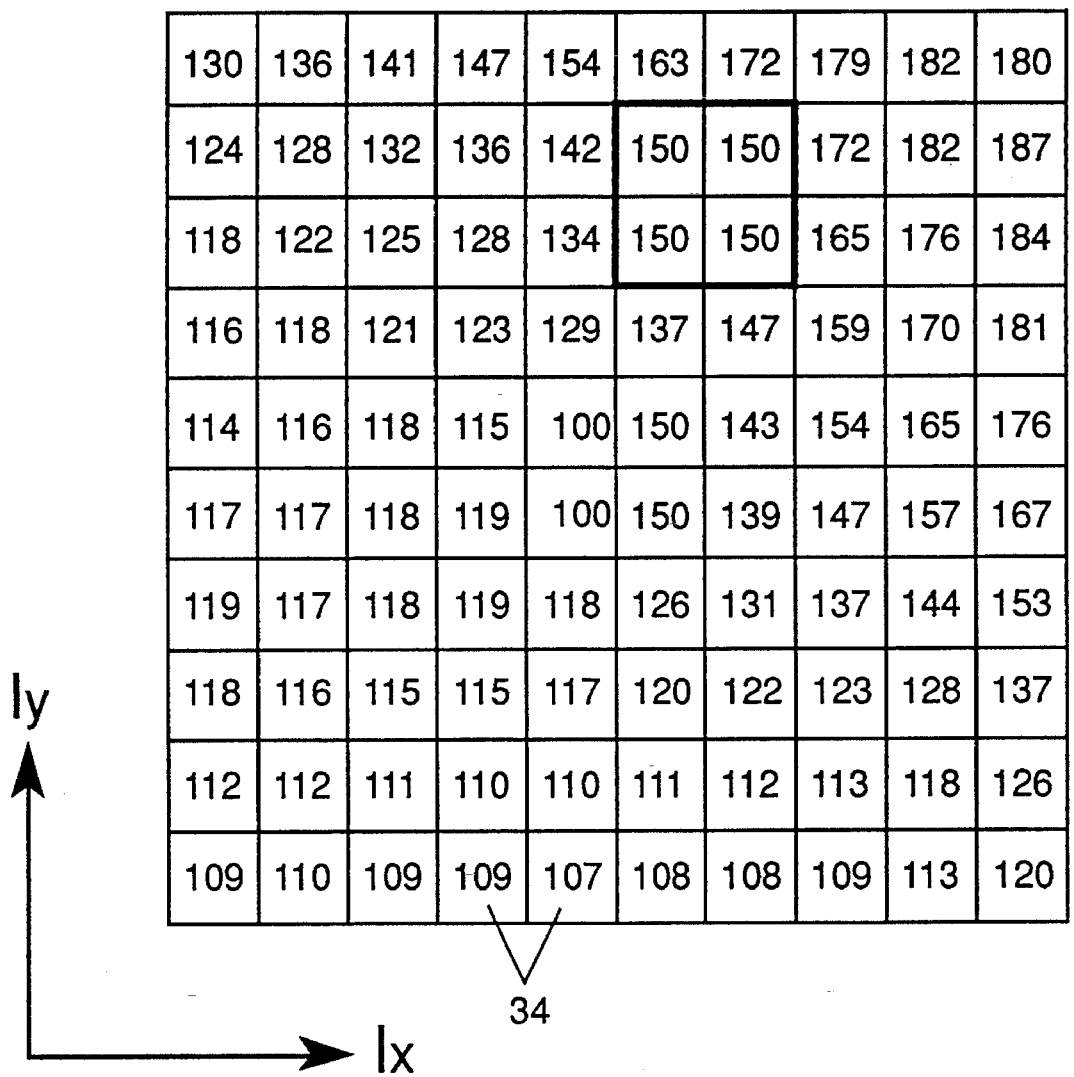
FIG. 2 is an illustration of pixel-by-pixel input density values for a small portion of a color separation.

Referring now to FIG. 2, in a typical halftone color separation which may be stored on disc 12, the gray level varies thereacross. The halftone color separation in general is hereinafter termed the input image and is divided into a first multiplicity of pixels 34 which are arranged along coordinate axes $I_x$ and $I_y$. Pixels 34 typically have a resolution of 100–400 pixels per inch along each of the coordinate axes of the input image.

Each average gray level for a pixel 34 is represented digitally in FIG. 2 by an input density level. There are typically provided 256 different input density levels, 0 being the lightest and 255 being the blackest.

In accordance with a preferred embodiment of the invention, and in contrast with the prior art, an non-periodic screen function is employed for screening the image. The use of this non-periodic screen function avoids undesired visual effects which sometimes occur when regular screen functions are employed, as in the prior art. Such undesired visual effects include periodic artifacts on a single screen color separation as well as periodic artifacts which arise when multiple screens are superimposed upon each other.

Figures 3, 4:
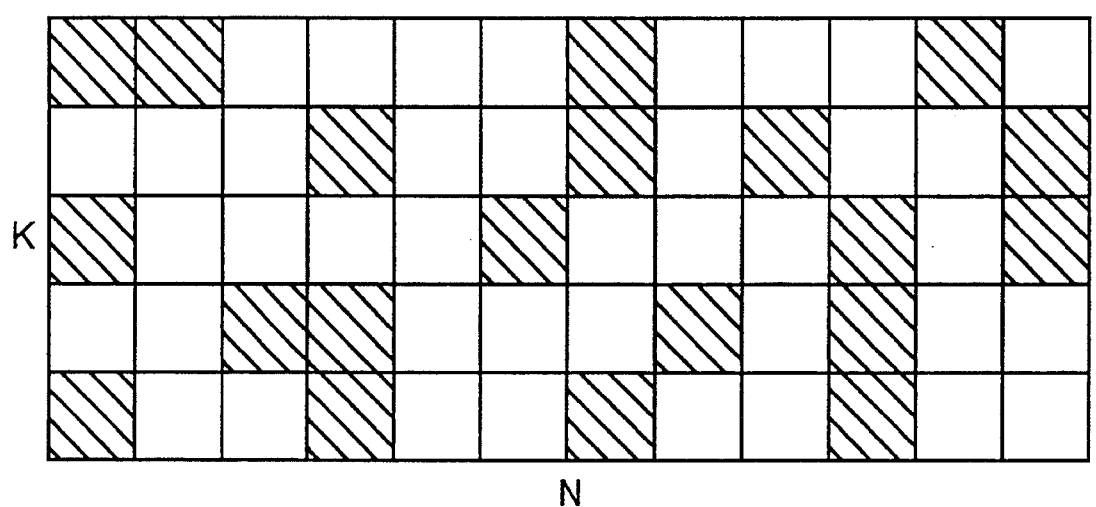
FIG. 3 is a matrix illustrating an non-periodic screen function employed in accordance with one embodiment of the present invention.
FIG. 4 is an illustration of part of a color separation produced using the non-periodic screen function of FIG. 3.

FIG. 3 illustrates, in matrix form, part of one such typical non-periodic screen function. The non-periodic screen function is characterized in that it covers a relatively large area but nevertheless maintains for each of a multiplicity of relatively small multi-pixel sub-areas, desired screen density percentages. In this manner, the non-periodic screen function avoids the presence of visual effects having a spatial frequency below a defined minimum. Normally this defined minimum constitutes the limit below which the human eye can discern such visual effects.

The indicia K and N are the typical dimensions of a stored function matrix. In practice K and N will each have values equal to at least one thousand pixels. It is appreciated that this stored function matrix can be repeated any desired number of times to cover an entire image.

FIG. 4 illustrates part of a screened color separation produced using the non-periodic screen function of FIG. 3. In the illustrated example, a uniform input density corresponding to halftone coverage of about 30% is employed. It may be appreciated from a consideration of FIG. 4, that generally for most groups of 16 adjacent pixels, a generally uniform halftone coverage is realized. This characteristic maintains the minimum spatial frequency of the black portions of the screened color separation.

Figures 5, 6:
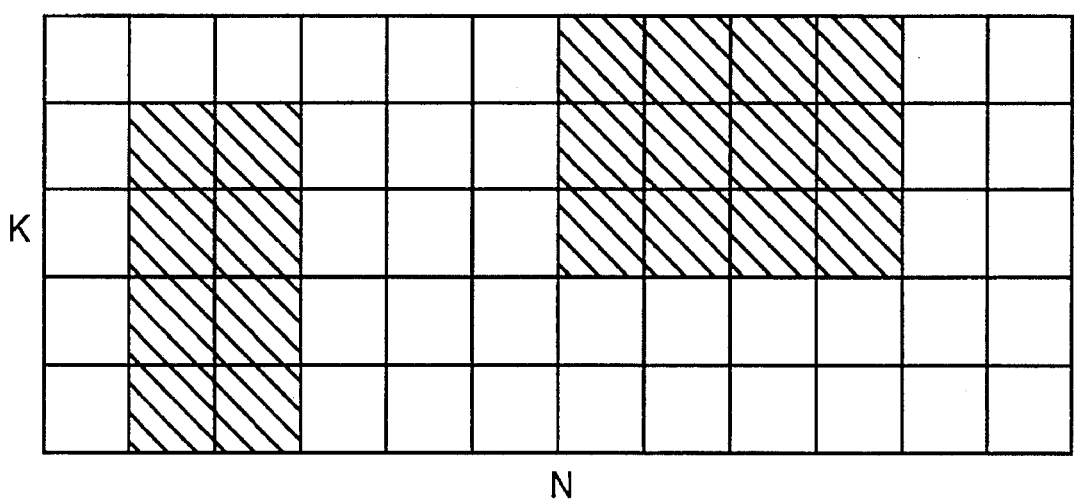
FIG. 5 is a matrix illustrating an non-periodic screen function employed in accordance with another embodiment of the present invention.
FIG. 6 is an illustration of part of a color separation produced using the non-periodic screen function of FIG. 5.

FIG. 5 illustrates, in an exaggerated form, part of another non-periodic screen function. Here, the black pixels are grouped together for reasons of enhanced printability. This grouping also has the effect of reducing the minimum spatial frequency of the screen color separation.

Here also, the non-periodic screen function is characterized in that it covers a relatively large area but nevertheless maintains for each of a multiplicity of relatively small multi-pixel sub-areas, desired screen density percentages. Here, however, the multi-pixel sub-areas for which this is true are larger than in the example shown in FIGS. 3 and 4.

FIG. 6 illustrates part of a screened color separation produced using the non-periodic screen function of FIG. 5. In the illustrated example, a uniform input density corresponding to halftone coverage of about 30% is employed.

Figure 7:
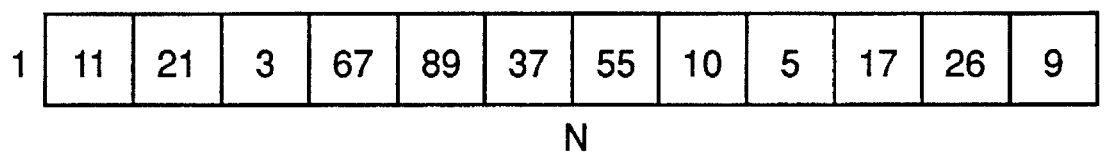
FIG. 7 is a matrix illustrating a one dimensional non-periodic screen function employed in accordance with yet another embodiment of the present invention.

FIG. 7 illustrates, in matrix form, part of a typical one-dimensional non-periodic screen function. The non-periodic screen function is also characterized in that it covers a relatively large elongate area but nevertheless maintains for each of a multiplicity of elongate relatively small multi-pixel sub-areas, desired screen density percentages. In this manner, the non-periodic screen function avoids the presence of visual effects having a spatial frequency below a defined minimum. Normally this defined minimum constitutes the limit below which the human eye can discern such visual effects.

The length of the function of FIG. 7 is preferably equal to at least one thousand pixels. It is appreciated that this stored function matrix can be repeated any desired number of times to cover an entire image.

Figure 8:
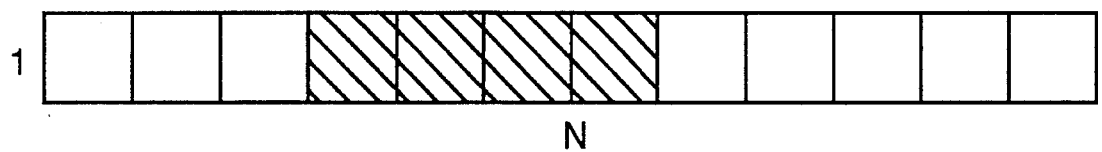
FIG. 8 is an illustration of part of a color separation produced using the one dimensional non-periodic screen function of FIG. 7.

FIG. 8 illustrates part of a screened color separation produced using the one-dimensional non-periodic screen function of FIG. 7. In the illustrated example, a uniform input density corresponding to halftone coverage of about 30% is employed. It may be appreciated that generally for most lines of about 30 adjacent pixels, a generally uniform halftone coverage realized. This characteristic maintains the minimum spatial frequency of the black portions of the screened color separation.

Figure 9:
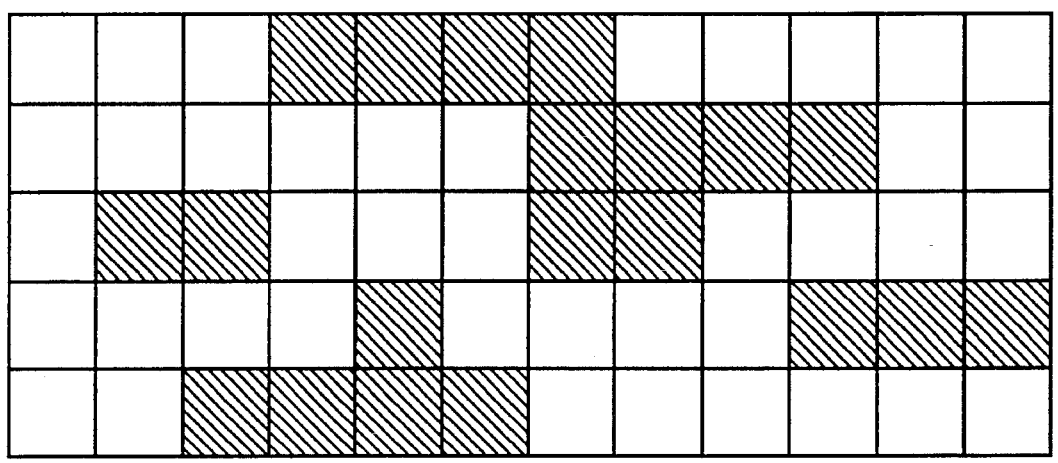
FIG. 9 is an illustration of part of a color separation produced using one dimensional non-periodic screen functions of the type illustrated in FIG. 7.

Reference is now made to FIG. 9, which is an illustration of part of a screened color separation produced using one dimensional non-periodic screen functions of the type illustrated in FIG. 7. In the illustrated example, it is seen that the first two rows are produced by the same function employed in FIG. 8, with an offset shift. The remaining rows are produced by other one-dimensional non-periodic functions.

It is appreciated that the screened color separation of FIG. 9 may be constructed by using a single function with suitable different offset shifts from line to line or alternatively using different functions, or, a combination of both. In order to avoid visual effects from line to line, when multiple functions are employed, they may be determined in a way so as to avoid such undesired visual effects.

Figure 10:
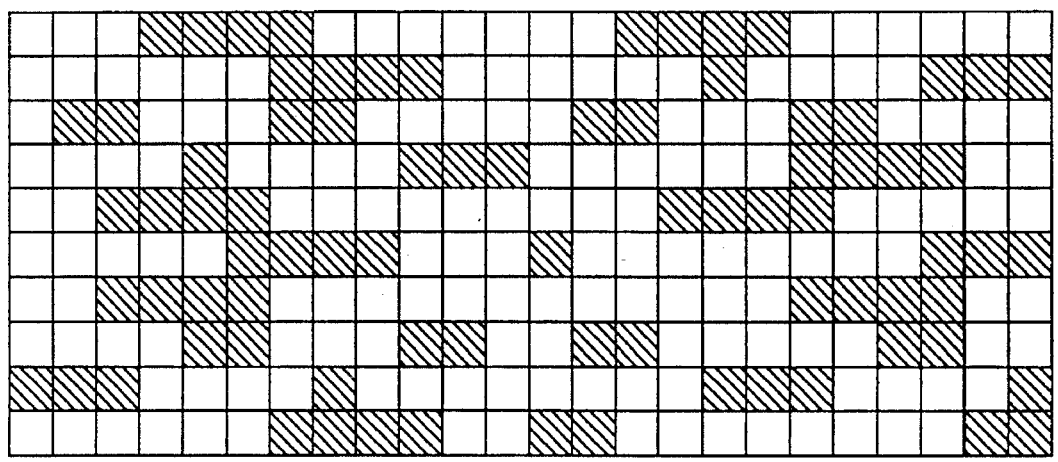
FIG. 10 is another illustration of part of a color separation produced using one dimensional non-periodic screen functions of the type illustrated in FIG. 7.

Reference is now made to FIG. 10, which is another illustration of part of a screened color separation produced using one dimensional non-periodic screen functions of the type illustrated in FIG. 7. Here a larger area of the screened color separation is shown so as to illustrate the non-periodic appearance of the screened separation. It is appreciated that when sufficiently small areas are considered, the desired halftone screen density is generally maintained.

Figure 11:
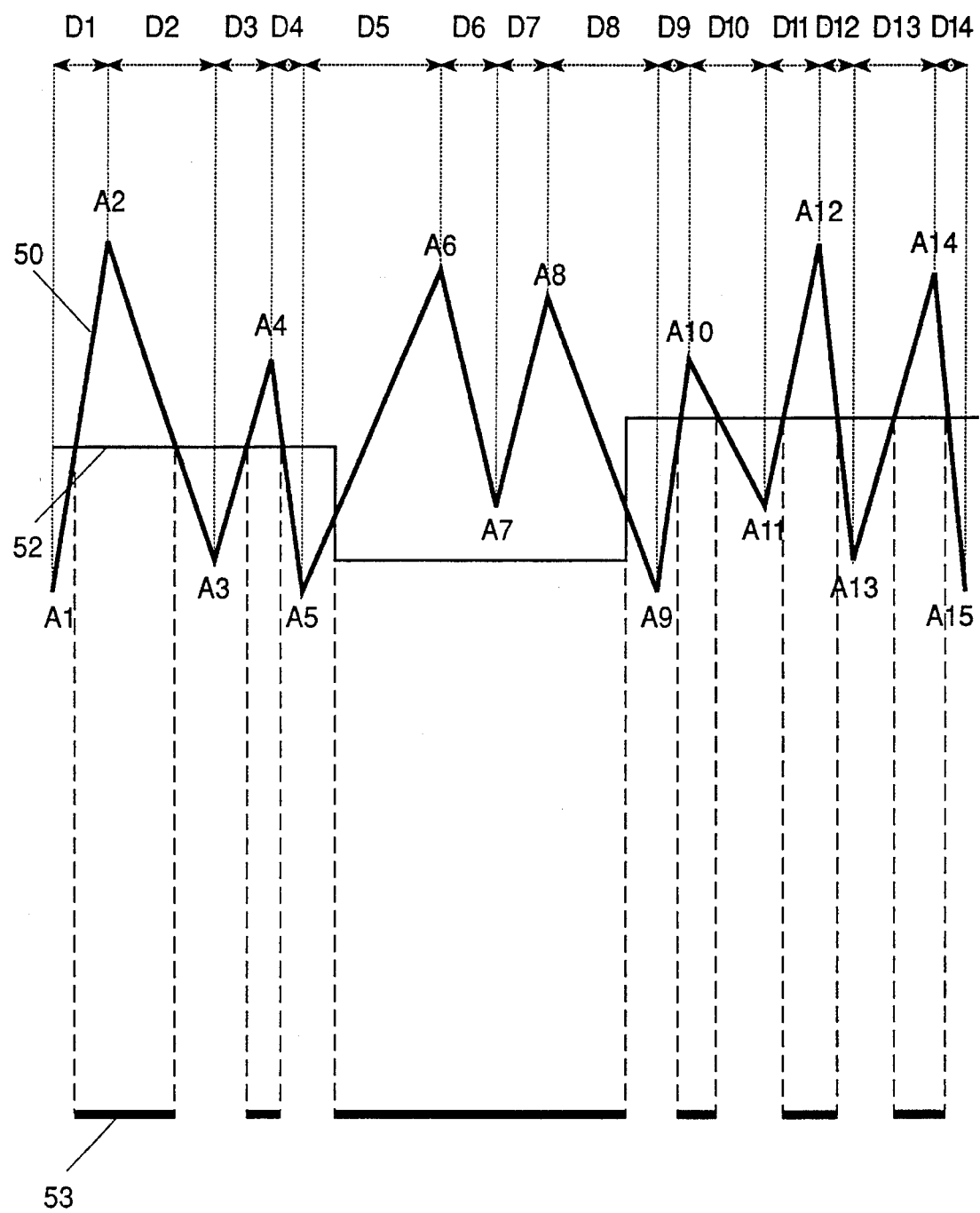
FIG. 11 is an illustration of the thresholding of an analog one dimensional non-periodic screen function against input density values of an original in accordance with yet another embodiment of the present invention and the resulting screen segments produced thereby.

Reference is now made to FIG. 11, which is an illustration of the thresholding of an analog one-dimensional non-periodic screen function 50 against input density values 52 of an original in accordance with yet another embodiment of the present invention and the resulting screen segments 53 produced thereby.

It is seen that the screen function 50 has a plurality of minima and maxima which are separated from each other by varying distances D1–D14. The amplitudes of the minima and maxima may also vary as can be seen from a consideration of values A1–A15.

The variation in the values D1–D14 and A1–A15 is non-periodic and, in accordance with a preferred embodiment of the invention, is limited to predetermined desired ranges. These ranges ensure that visual effects are not normally sensible by the human eye.

Comparison of the screen function 50 with an input density function 52 produces screen segments 53, which represent laser plotter on and off locations along a line.

It is a particular feature of the use of an analog one-dimensional non-periodic function that effectively infinite resolution along the line may be realized. Thus, along a relatively short distance, i.e. that traversed by the function 50 between minimum A1 and maximum A2, all of the grey levels are represented. In a cycle between adjacent pairs of minima, a screen segment is produced which is capable of accurately representing all grey levels of the input image.

Figure 12:
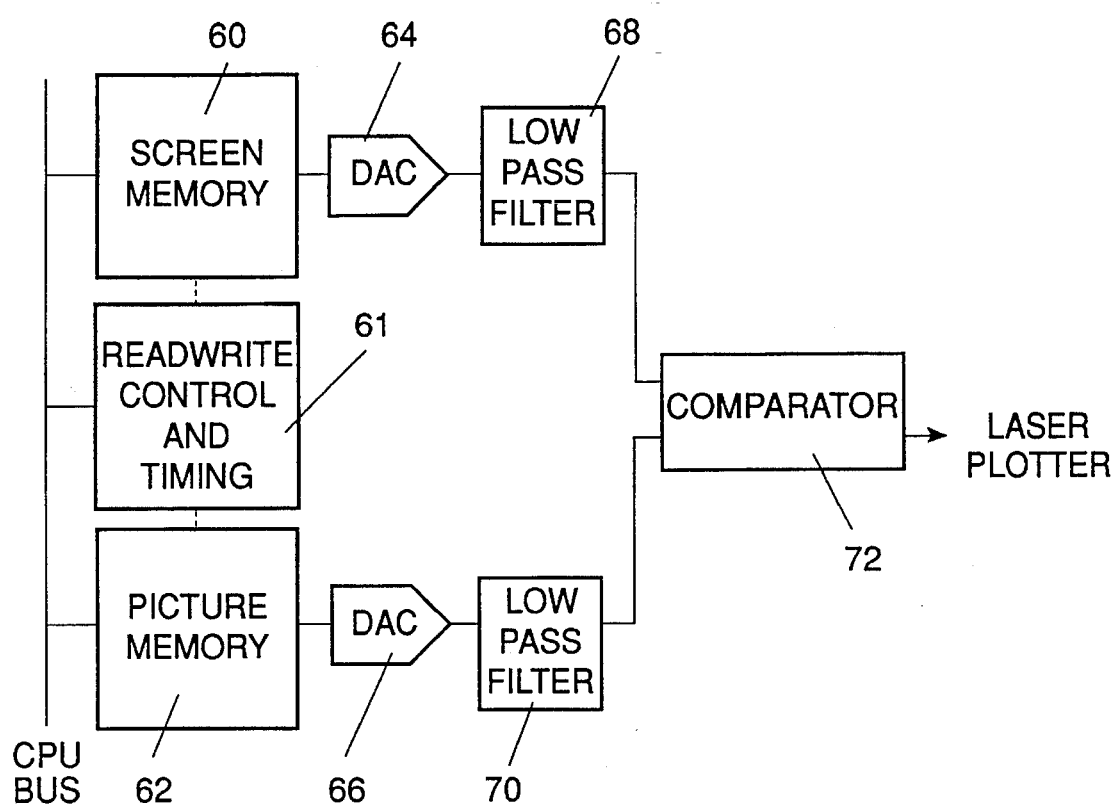
FIG. 12 is a simplified block diagram illustration of apparatus for screen dot generation operative in accordance with a preferred embodiment of the invention.

Referring now additionally to FIG. 12, it will be understood that digital values representing the screen function 50 are supplied to a screen memory 60, and the input density values of pixels 34 are supplied to a picture memory 62. Screen memory 60 and picture memory 62 are typically controlled by a read/write and timing control unit 61.

The contents of memories 60 and 62 are supplied via respective digital to analog converters 64 and 66 to respective low pass filters 68 and 70. It is noted that under certain circumstances, low pass filter 70 may be omitted.

It will be appreciated that the low pass filter 68 is adapted to extrapolate and interpolate the values stored in memory 60 so as to provide an accurate reproduction of the non-periodic screen function. The inclusion of low pass filter 70 depends on the quality of the input image.

The outputs of low pass filters 68 and 70 are supplied to a comparator 72, which provides an output indication to expose control circuitry 24, indicating when the laser plotter 26 is to write. It is noted that there may also be provided various additional control functions, such as intensity control, to enhance the operation of the laser plotter 26.

Alternatively, the apparatus of FIG. 12 may be embodied in a full digital implementation, without requiring D-A converters and low pass filters.

It will be appreciated by persons skilled in the art that the present invention is not limited by what has been particularly shown and described hereinabove. Rather the scope of the present invention is defined only by the claims which follow:

We claim:

1. A method for generating a half tone reproduction of an image comprising the steps of:
    providing a representation of an original having input density values representing the grey levels of various locations of the original for a given color separation;
    defining a desired one-dimensional non-periodic screen function for each line of the image; and
    writing screen segments in a line by line fashion, wherein each screen segment is a line whose length and location is determined by employing the input density value of the original and the corresponding one-dimensional non-periodic screen function.

2. A method according to claim 1 and wherein each segment has generally unlimited resolution along its length.

3. A method according to claim 1 and wherein said step of writing screen segments includes the following steps:

storing the input density values of the original at a first spatial resolution; and
    storing the threshold values of the desired one-dimensional non-periodic screen function at a second spatial resolution different from the first resolution.

4. A method according to claim 3 and wherein the second spatial resolution corresponds to the line to line spatial resolution of a plotter used for writing the screen segments.

5. A method according to claim 1 and wherein the step of writing screen segments includes the following steps:
    prior to plotting, defining the one-dimensional non-periodic screen function; and
    thereafter comparing the input density values along the line with the corresponding one-dimensional non-periodic screen function to determine the length and location of each segment produced by the plotter.

6. A method according to claim 1 and wherein said non-periodic one dimensional screen function has a plurality of maxima and minima and wherein said screen function displays non-periodicity in at least one of the spatial separation of the minima and maxima and in the values of the minima and maxima.

7. A method according to claim 1 and wherein a different shift is added to the one-dimensional non-periodic screen function at the beginning of each line.

8. A method according to claim 1 and wherein the step of writing screen segments comprises determining the length and location of each screen segment in an analog operation by employing the input density values of the original and the desired one-dimensional non-periodic screen function.

9. A method according to claim 8 and wherein said analog operation comprises and analog comparison of the input density values with threshold values defined by the desired one-dimensional non-periodic screen function.

10. Apparatus for generating a half tone reproduction of an image comprising:
    apparatus for providing a representation of an original having input density values representing the grey levels of various locations of the original for a given color separation;
    apparatus for defining a desired one-dimensional non-periodic screen function for each line of the image; and
    apparatus for writing screen segments in a line by line fashion, wherein each screen segment is a line whose length and location is determined by employing the input density value of the original and the corresponding one-dimensional non-periodic screen function.

11. Apparatus according to claim 10 and wherein said non-periodic one dimensional screen function has a plurality of maxima and minima and wherein said screen function displays non-periodicity in at least one of the spatial separation of the minima and maxima and in the values of the minima and maxima.

12. Apparatus according to claim 11 and wherein each segment has generally unlimited resolution along it length.

13. Apparatus according to claim 10 and wherein said apparatus for writing screen segments includes:
    apparatus for storing the input density values of the original at a first spatial resolution; and
    apparatus for storing the threshold values of the desired one-dimensional non-periodic screen function at a second spatial resolution different from the first resolution.

14. Apparatus according to claim 13 and wherein the second spatial resolution corresponds to the line to line spatial resolution of a plotter used for writing the screen segments.

15. Apparatus according to claim 10 and wherein the apparatus for writing screen segments includes:

apparatus operative, prior to plotting, for defining the one-dimensional non-periodic screen function; and apparatus for comparing the input density values along the line with the corresponding one-dimensional non-periodic screen function to determine the length and location of each segment produced by the plotter.

16. Apparatus according to claim 10 and wherein a different shift is added to the one-dimensional non-periodic screen function at the beginning of each line.

17. Apparatus according to claim 10 and wherein said apparatus for writing screen segments is operative to determine the length and location of each screen segment in an analog operation by employing the input density values of the original and the desired one-dimensional non-periodic screen function.

18. Apparatus according to claim 17 and wherein said analog operation comprises an analog comparison of the input density values with threshold values defined by the desired one-dimensional non-periodic screen function.

19. Apparatus for halftone reproduction of an image comprising:

apparatus for providing a representation of an original having input density values at various locations of the original;

apparatus for defining at least one non-periodic one-dimensional screen function for the image, said non-periodic screen function having a spatial repeatability sufficiently small so that it is not normally visible by the human eye; and apparatus for providing output data to a plotter based on manipulation of said input density values on the basis of said at least one non-periodic one-dimensional screen function.

20. Apparatus for halftone reproduction of an image comprising:

apparatus for providing a representation of an original having input density values at various locations of the original;

apparatus for defining a desired non-periodic screen function for the image, said non-periodic screen function having a minimum spatial frequency which is higher than that normally visible by the human eye; and apparatus for providing output data to a plotter based on manipulation of said input density values on the basis of said non-periodic screen function.

said non-periodic screen function having a minimum spatial frequency of 6 pairs of minimum-maximum pairs per millimeter.

21. A method for halftone reproduction of an image comprising the steps of:

providing a representation of an original having input density values at various locations of the original;

defining at least one non-periodic one-dimensional screen function for the image, said non-periodic screen function having a minimum spatial frequency which is higher than that normally visible by the human eye; and providing output data to a plotter based on manipulation of said input density values on the basis of said at least one non-periodic one-dimensional screen function.

22. A method for halftone reproduction of an image comprising the steps of:

providing a representation of an original having input density values at various locations of the original;

defining at least one non-periodic one-dimensional screen function for the image, said non-periodic screen function having a spatial repeatability sufficiently small so that it is not normally visible by the human eye; and providing output data to a plotter based on manipulation of said input density values on the basis of said at least one non-periodic one-dimensional screen function.

23. A method for halftone reproduction of an image comprising the steps of:

providing a representation of an original having input density values at various locations of the original;

defining a desired non-periodic screen function for the image, said non-periodic screen function having a minimum spatial frequency which is higher than that normally visible by the human eye; and providing output data to a plotter based on manipulation of said input density values on the basis of said non-periodic screen function.

said non-periodic screen function having a minimum spatial frequency of 6 pairs of minimum-maximum pairs per millimeter.

24. Apparatus for halftone reproduction of an image comprising:

apparatus for providing a representation of an original having input density values at various locations of the original;

apparatus for defining at least one non-periodic one-dimensional screen function for the image, said non-periodic screen function having a minimum spatial frequency which is higher than that normally visible by the human eye; and apparatus for providing output data to a plotter based on manipulation of said input density values on the basis of said at least one non-periodic one-dimensional screen function.

\* \* \* \* \*